April 24, 1962 V. E. HAMREN ETAL 3,030,983
BELLOWS
Filed March 16, 1961
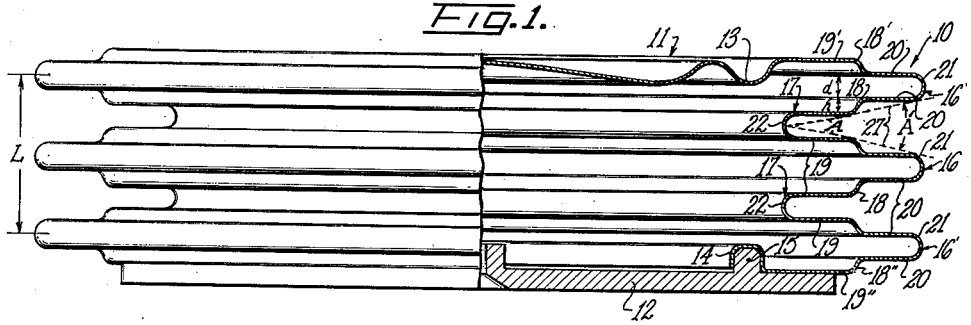
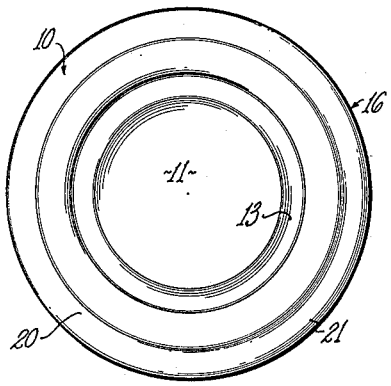
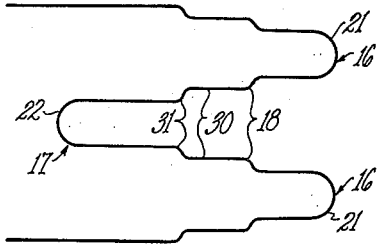
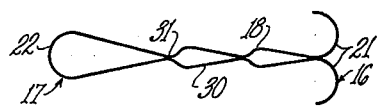
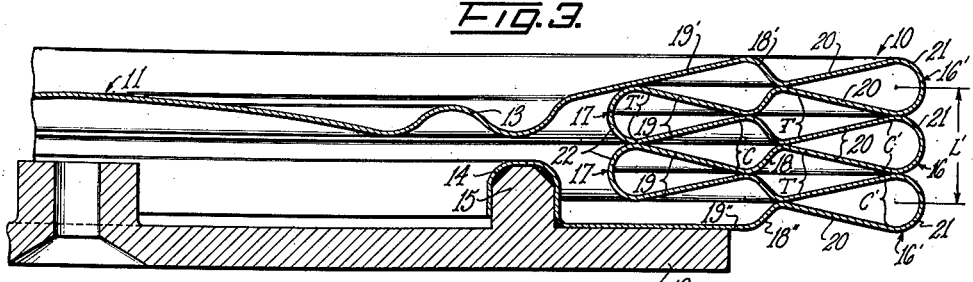
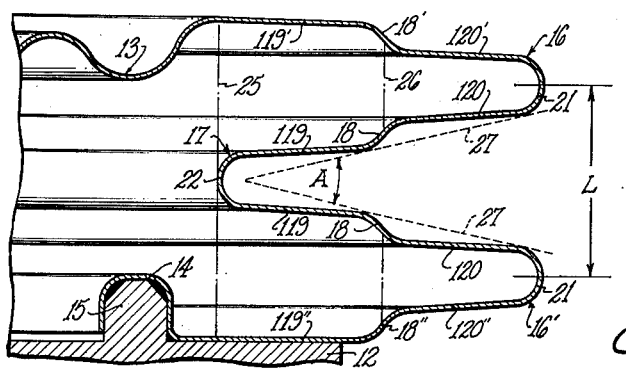
INVENTOR.
VICTOR E. HAMREN
GEORGE L. GLAESER, JR.
BY
*Lynn H. Latta*
ATTORNEY United States Patent Office 3,030,983
Patented Apr. 24, 1962

3,030,983
BELLOWS
Victor E. Hamren and George L. Glaeser, Jr., Los Angeles, Calif., assignors to Mechtronics Corporation, Los Angeles, Calif., a corporation of California
Filed Mar. 16, 1961, Ser. No. 96,193
10 Claims. (Cl. 137—796)

This invention relates to bellows and has as its general object to provide a bellows of significantly increased collapsibility, as determined by the ratio between its free length and its length when fully collapsed. More specifically, the invention provides a bellows having approximately a fifty percent increase in collapsibility over that of conventional bellows. For example, where a conventional bellows may be collapsible to a maximum extent of fifty percent of its free length, the bellows of my invention may be collapsed to a length equal to approximately one third or less its free length.

A further object is to provide a bellows which attains such an improvement in collapsibility in combination with minimum spring rate characteristics and, consequently, maximum sensitivity to fluid pressure changes sensed by the bellows, or to force applied to the bellows in deflecting the same.

Another object is to provide a bellows which combines with the improvements in collapsibility and sensitivity referred to above, a very decided improvement in differential volume displacement.

Other objects and advantages will become apparent in the ensuing specifications and appended drawing, in which:

FIG. 1 is a side view, partially in cross section, on an enlarged scale, of a bellows unit embodying the invention;

FIG. 2 is a plan view of the same, with a portion thereof broken away and shown in section;

FIG. 3 is a sectional view of the bellows shown in collapsed condition;

FIG. 4 is a fragmentary sectional view of a modified form of the bellows, on a further magnified scale;

FIG. 5 is a schematic section of a bellows embodying another modification of the invention; and FIG. 6 is a schematic section of the bellows of FIG. 5, fully collapsed.

Referring now to the drawing in detail, and in particular to FIG. 1, I have shown therein, as an example of one form in which the invention may be embodied, a bellows unit embodying a corrugated tubular lateral wall portion 10, a head 11 integral with one end thereof, and a base 12 to which the other end of the lateral wall portion 10 is secured and sealed.

The head 11 may be joined to the corrugated lateral wall 10 by a re-entrant annular semi-toroidal bead 13, and the opposite, open end of the corrugated lateral wall section 10 may be joined to the base 12 by a re-entrant annular bead or channel 14 as shown in FIG. 4. The channel 14 receives and is suitably soldered or otherwise sealed to an annular axial flange 15 which may be formed integrally with the base 12. Thus a sealed bellows capsule may be provided.

The invention is particularly characterized by the cross-sectional configuration of the corrugated lateral wall 10, which, in general, comprises a plurality of peripheral, outwardly protruding corrugations 16, 16' (there may be any selected number of these peripheral corrugations depending upon the requirements for total deflection range); one or more re-entrant, inward corrugations 17; intermediate axially-offset shoulders 18 joining the reentrant corrugations 17 to the adjacent peripheral corrugations 16; end shoulders 18', 18'', symmetrically related to the shoulders 18; and end walls 19' and 19'', of generally flat radial ring form normally (in the free length condition of the bellows) integrally joining the shoulders 18', 18'' respectively to the bead 13 and channel 14. The peripheral corrugations 16 are of narrow, deep U-section, each comprising respective outer radial side walls 20, normally of generally flat radial ring form, and a semi-toroidal convex rim web 21 bridging between and integrally joining the outward margins of the respective side walls 20. The re-entrant corrugation 17 likewise comprises a pair of normally flat, inner radial side walls 19 of generally flat ring form and a concave semi-toroidal reentrant neck web 22 bridging between and integrally joining the inward margins thereof. The outward margins of inner radial walls 19 are integrally joined to the inward margins of intermediate shoulder 18. The inward margins of outer radial wall 20 (those which are adjacent to corrugation 17) are integrally joined to the outward margins of offset shoulders 18. The inward margins of the outer radial walls 20 at the opposite sides of the respective corrugations 16 are integrally joined to the outward margins of the end shoulders 18', 18''.

The term "radial" as used herein to describe the walls 19 and 20, designates the positioning of these walls substantially in flat planes perpendicular to the longitudinal axis of the bellows, such as would be generated by rotation of respective axially-spaced radii about said axis.

In the specific form disclosed in FIG. 1, the radial walls 19, 19', 19'', 20, are normally flat (in the free state of the bellows). Such walls may however, be slightly dished or frusto conical, as shown in FIG. 3. The terms "radial" and "generally flat" are intended to embrace both of these specific forms.

The end walls 19' and 19'' correspond generally to the inner radial walls 19 in that they are symmetrically opposed thereto on opposite sides of the respective peripheral corrugations 16. In the collapsing action of the bellows, the end walls deflect in substantially the same manner that the walls 19 of re-entrant corrugation 17 deflect.

The convex rim webs 21 and the concave neck webs 22 are of substantially equal diameter (axial depth). The axial height of each shoulder 18 (as determined by the axial spacing between the planes of an inward radial wall 19 and the adjoining outward radial wall 20) is approximately one-half the axial depth of webs 21 and 22, the relationship between these dimensions being such that, in the fully collapsed condition of the bellows as shown in FIG. 3, the shoulders 18 will abut one another at their inward margins and the peripheral webs 21 of the adjacent corrugations 16, 16' will simultaneously abut one another at their adjacent side. Also, the peripheral necks 22 of adjacent corrugations 17 will simultaneously abut one another at their adjacent sides. Since the axial, height of each shoulder 18 is equal to one-half the axial depth of re-entrant neck web 22, the total aggregate axial spacing between the outer radial walls 20 (and between the adjacent sides of rim webs 21) is approximately twice the axial depth of a rim web 21. Accordingly, in the fully collapsed condition of the bellows, its length, as measured axially along the contacting rims 21, will be reduced to one third of its free length as measured between the centers of end rims 21 when spread apart. This will be more apparent in the relatively short bellows disclosed herein, if the free length is measured between the centers of the rims 21 as indicated at L in FIG. 1, and the collapsed length is measured between the centers of the same rims as indicated at L' in FIG. 3. At the same time, the fluid capacity volume of the bellows in the annular area of tubular wall 10 is substantially equivalent to that of a conventional bellows having a simple corrugated lateral wall structure with axial depth of each corrugation substantially equal to axial depth of the intervening spaces (which would have a volume approximately one half of the volume of an annular cylindrical space of the same inner and outer radial dimensions).

This will be generally apparent in FIG. 4, wherein the aggregate volume of the enclosed portion of the corrugation area between radii 25 and 26 is sufficiently more than half the volume of an annular cylindrical space defined between those radii, to substantially offset the difference between the aggregate volume of the spaces in peripheral corrugations 16, 16' outwardly of the radius 26, and the volume of an annular cylindrical space having the same inner and outer radii as the corrugations 16, 16'. Also, the effective area is substantially the same since the effective diameter remains approximately the same diameter between the inner and outer radii. Therefore, a greater fluid differential volume displacement is possible due to greater deflection. This is true even if a convention convolution were only as deep as to the shoulder 18. Thus, the advantages are considerable in increasing differential volume displacement and reducing spring rates.

Collapse of the bellows is accomplished by bending of the peripheral and re-entrant webs 21 and 22, and by corresponding flexing of the outer and inner radial walls 20 and 19 and the intermediate shoulders 18, 18' and 18'' with a moderate Belleville flexing action in which the radial walls 19 and 20 are distorted from their normal flat condition to frusto-conical form as indicated in FIG. 3, and in which the shoulders 18, etc. are slightly flattened. The overall deformation is particularly characterized by the development of compression and tension stresses and strains alternately along the radius of the corrugated wall section 10, from the periphery to the inward extremity thereof at the re-entrant web or webs 22. More specifically, compression is developed in the outward marginal areas of radial walls 19 and 20, indicated at C and C'; circumferential hoop tension is developed in the inward extremities of radial walls 19 and 20, indicated at T and T'. In the intermediate shoulders 18, compression is developed in the inward extremities thereof and hoop tension is develop in the outward extremities thereof as indicated at C and T respectively. Because the radial wall structure of the corrugated wall section 10 is subdivided into three separate annular zones, all substantially less than half the aggregate radial width of the corrugated wall structure 10, the spring rate of the composite corrugated wall structure 10 can be kept at a minimum sufficiently low so that maximum sensitivity of response is thereby attained in the bellows structure. This characteristic is combined with the substantially one-third or greater increase in collapsibility described above, and the sensitivity of response is particularly high in that portion of the range corresponding to the range of normal collapsing operation of a conventional bellows (e.g. approximately the first half of the range of collapsing movement from free length toward fully collapsed condition). Consequently, the invention attains a very decided improvement in sensitivity.

FIG. 1 illustrates the degree of collapsibility in terms of angularity of deflection between adjacent corrugated walls of the corrugated wall structure 10. This is indicated by the lines 27—27 of FIG. 4, defining the angle A representing approximately the total angle of deflection between adjoining corrugations. The tangency of the broken lines 27 to the shoulders 18 and rim webs 21 indicates the arrangement of the opposed pairs of these parts to establish approximately simultaneous contact in the fully collapsed position of the bellows, although it will be understood that contact of shoulders 18 may occur after or before (preferably before) contact of rim webs 21 is established.

Since the collapse of the bellows will involve a bending of each neck web 22 around a locus which may be visualized as a circumference of the longitudinal axis of the bellows, in a plane perpendicular to said axis approximately midway between the planes of adjoining bellows walls 19, with the radius of said circumference being located adjacent the center of the respective web 22 (e.g. at some point between the points indicated in FIGS. 1 and 4 respectively as the apices of angle A as shown in these figures) the acute angle A may conveniently be defined as an angle having its vertex at the said locus of bending movement.

Attempts have been made to increase the range of collapsibility of a bellows by utilizing a corrugated cross section wherein relatively small diameter peripheral and re-entrant webs (such as the webs 21 and 22) are bridged by normally frusto-conical walls extending with substantially uniform inclination from the re-entrant webs to the peripheral webs. Such structures, however, are subject to the objection that in the deflection of such Belleville-spring wall structures, if deflected through an angle comparable to the angle A of FIG. 4, the hoop tension forces developed in the circumferential stretching of their outer areas, and the high compression forces developed reactively in their inward marginal areas, are of such a degree that higher spring rates are involved and sufficient linearity of response is not as easily attained, and that under such conditions, radial walls 20 may undergo greater Belleville flexure than radial walls 19, (i.e., may continue to deflect after contact between shoulders 18 is established) or vice versa.

However, very shallow frusto-conical configuration in the radial walls, as illustrated in FIG. 4 at 119, 119', 119'', 120, 120' and 120'' may be utilized with additional advantages, while avoiding the disadvantage mentioned in the preceding paragraph. By utilizing the same proportion between $h$ (height of shoulders 18) and D (diameter or depth of webs 20 and 22) as expressed by the ratio $h=1/2D$, and a slight conical inclination of the radial walls to the extent indicated in FIG. 4 ordinarily between 3° and 10° the ratio between free length L (FIG. 1) and collapsed length L' (FIG. 3) may be increased substantially (e.g. from 3 to about 3½ or more). The ratio of collapsed length to free length may be decreased correspondingly. Also, the tension and compression loads set up in the inward areas and outward areas respectively of the radial walls 19, 20 etc. in the fully collapsed bellows, are of a lower order of magnitude because of the slightly conical form of these walls in their free state.

As shown in FIGS. 5 and 6, the outward convolutions 16 (indicated schematically) may be joined to the re-entrant convolutions 17 by intermediate radial walls 30, with offset annular shoulders 18 and 31 interposed between the several radial walls. Here the free length or pitch (between any two adjacent convolutions) is equal to $2D+4h$ (the diameters of webs 21 and 22 added together plus the aggregate height of four of the shoulders 18, 31). Since $4h$ is equal to $2D$, the free length is equal to four times the collapsed length ($1/2D+1/2D$) and the length of the collapsed bellows is therefore only one fourth its free length.

For some applications, the invention contemplates incorporating variable sensitivity in successive stages of deflection, attained by proportioning the inward and outward corrugations to one another in a relationship such that contact of shoulders 18 will occur in advance of engagement between rim webs 21, and additional deflection resistance will be presented by outward radial walls 20 in the final stages of deflection of radial walls 20 in bringing their rim webs 21 together following contact of shoulders 18. This result is attained in the structure shown in FIGS. 1 and 3, in which 27 represents two different angles A and A'.

The bellows of this invention has been successfully attained by us in a chemical deposited bellows structure such as that disclosed in the application of Victor E. Hamren, Serial No. 770,771, for Miniature Pressure Sensing Element and Method of Fabricating the Same, and we have found that this invention is most readily attained in such a structure.

I claim:

1. In a pressure-sensitive bellows: a corrugated lateral wall structure comprising a plurality of annular peripheral corrugations of U-section comprising substantially flat and parallel outer walls and semitoroidal convex rim webs each joining a pair of said outer walls; at least one reentrant corrugation comprising a pair of substantially flat and parallel inner walls and a single concave semi-toroidal neck web integrally joining the inner margins of said inner walls; and annular shoulder webs integrally joining the outer margins of said inner walls to the inner margins of said outer walls, said pair of inner walls being normally disposed in relatively closely spaced planes perpendicular to the longitudinal axis of the bellows, and the opposed outer walls of adjacent peripheral corrugations being normally disposed in relatively widely spaced planes parallel to and offset axially outwardly from said closely spaced planes, said annular shoulder webs and rim webs being substantially tangent to straight sides of acute angles having their respective vertices at the loci of bending of said neck webs during collapse and extension of said bellows, whereby collapse of said bellows will bring opposed shoulder webs substantially into abutting engagement with one another and rim webs substantially into abutting engagement with one another.

2. In a pressure sensitive bellows: a corrugated lateral wall structure comprising a plurality of annular peripheral corrugations of U-section comprising axially spaced outer walls and semi-toroidal convex rim webs each joining a pair of said outer walls; at least one reentrant corrugation comprising a pair of axially spaced inner walls and a single concave semi-toroidal neck web integrally joining the inner margins of said inner walls; and means including annular shoulder webs integrally joining the outer margins of said inner walls to the inner margins of said outer walls, said walls being disposed in planes substantially parallel to one another in the unstressed condition of the bellows, with the inner walls in relatively closely spaced relation and the opposed outer walls of adjacent peripheral corrugations in relatively widely spaced relation to one another and offset axially outwardly with relation to said closely spaced inner walls, said annular shoulder webs and rim webs being substantially tangent to straight sides of acute angles having their respective vertices at the loci of bending of said neck webs during collapse and extension of said bellows, whereby collapse of said bellows will bring said shoulder and rim webs substantially into abutting engagement simultaneously with opposed like members.

3. A bellows as defined in claim 2, wherein said neck and rim webs are of substantially equal cross-sectional diameter.

4. A bellows as defined in claim 3, wherein the axial spacing between centers of adjacent peripheral corrugations is three times the spacing between opposed inner walls where joined to a neck web, whereby the ratio of collapsed length to free length is about 1/3.

5. A bellows as defined in claim 2, wherein said walls are of shallow frusto-conical form, and the ratio of collapsed length to free length is less than 1/3.

6. A bellows as defined in claim 2, including end walls and annular shoulder webs joining said end walls to the outer walls at the respective ends of the bellows.

7. A bellows as defined in claim 2, wherein there are but two of the peripheral corrugations and a single reentrant corrugation bridging between said peripheral corrugations.

8. A bellows as defined in claim 2, wherein there are three walls of substantially equal radial width, and two annular shoulders, in each half corrugation.

9. In a pressure-sensitive bellows: a corrugated lateral wall structure comprising a plurality of annular peripheral corrugations of U-section comprising normally flat, axially spaced outer walls and semi-toroidal convex rim webs each joining a pair of said outer walls; at least one reentrant corrugation comprising a pair of normally flat, axially spaced inner walls and a single concave semi-toroidal neck web integrally joining the inner margins of said inner walls; said outer and inner walls being disposed generally in parallel planes perpendicular to the longitudinal bellows axis and having substantially equal radial widths; and annular shoulder webs, each having an axial height substantially equal to the cross-sectional radius of a web, integrally joining the outer margins of said inner walls to the inner margins of said outer walls, said pair of inner walls being normally disposed in relatively closely spaced planes, and the opposed outer walls of adjacent peripheral corrugations being normally disposed in planes spaced axially a distance equal to twice the axial spacing between said inner walls, said annular shoulder webs and rim webs being substantially tangent to straight sides of acute angles having their respective vertices at the loci of bending of said neck webs during collapse and extension of said bellows, whereby collapse of said bellows will bring opposed shoulder webs substantially into abutting engagement with one another and rim webs substantially into abutting engagement with one another.

10. In a pressure sensitive bellows: a corrugated lateral wall structure comprising a plurality of annular peripheral corrugations of U-section comprising axially spaced outer walls and semi-toroidal convex rim webs each joining a pair of said outer walls; at least one reentrant corrugation comprising a pair of axially spaced inner walls and a single concave semi-toroidal neck web integrally joining the inner margins of said inner walls; and means including annular shoulder webs integrally joining the outer margins of said inner walls to the inner margins of said outer walls, said walls being disposed in substantially radial planes perpendicular to the longitudinal bellows axis and substantially parallel to one another in the unstressed condition of the bellows, with the inner walls in relatively closely spaced relation and the opposed outer walls of adjacent peripheral corrugations in relatively widely spaced relation to one another and offset axally outwardly with relation to said closely spaced inner walls, said annular shoulder webs and rim webs being substantially tangent to straight sides of acute angles having their respective vertices at the loci of bending of said neck webs during collapse and extension of said bellows, whereby collapse of said bellows will bring said shoulder and rim webs substantially into abutting engagement simultaneously with opposed like members, said neck and rim webs having a cross-sectional diameter approximately one fourth the axial spacing between centers of adjacent rim webs in the free length of the bellows.

References Cited in the file of this patent

UNITED STATES PATENTS 781,939    Fulton _____ Feb. 7, 1905